Nov. 18, 1930.  H. W. CLARK  1,782,029
GARDEN SHEARS
Filed Oct. 12, 1929
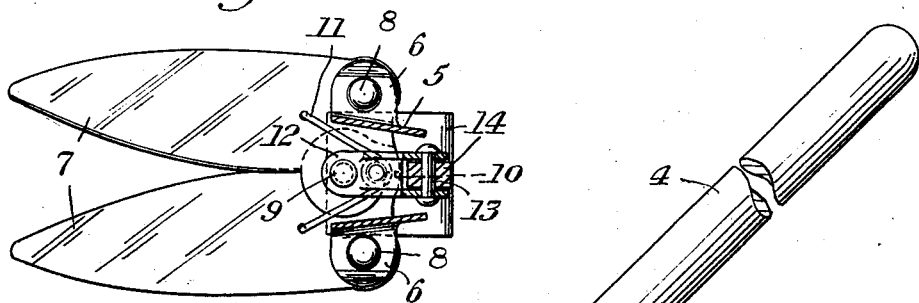
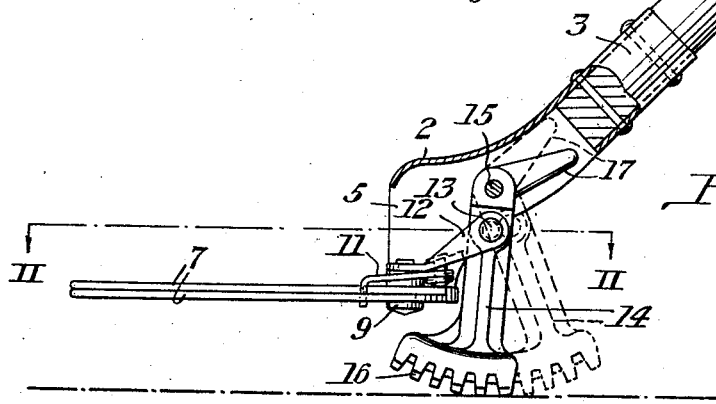
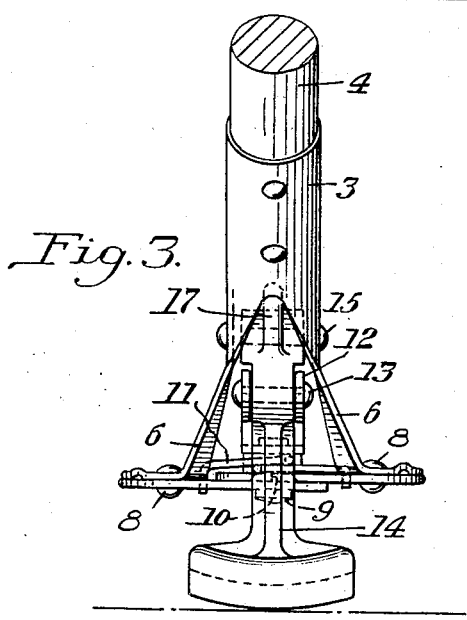
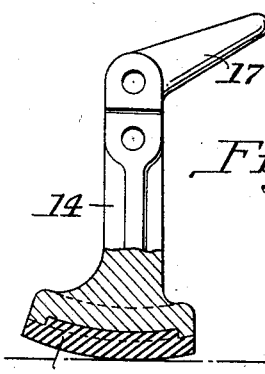
INVENTOR
Harold W. Clark,
by his attys,
Byrnes, Stebbins, Parmelee & Blenko Patented Nov. 18, 1930

1,782,029

UNITED STATES PATENT OFFICE

HAROLD W. CLARK, OF ALLIANCE, OHIO, ASSIGNOR TO THE ALLIANCE MANUFACTURING COMPANY, OF ALLIANCE, OHIO, A CORPORATION OF OHIO

GARDEN SHEARS

Application filed October 12, 1929. Serial No. 399,267.

This invention relates to garden shears such as are used for trimming grass, and provides a novel operating mechanism whereby the user is relieved from the necessity of stooping, while at the same time maintaining full control of the operation of the shear. In the patent to William Dooley No. 1,618,817 there is described and claimed a shear wherein a handle carries two pivoted shear blades and an operating lever connected therewith. The blades lie in a horizontal plane while the operating lever is rockable in a vertical plane. This materially relieves the strain on the arm and wrist of a user compared to the effort required in using a grass shear of the ordinary type. However, it still requires that the user stoop over and, particularly where there is a great amount of grass to be trimmed, this becomes tiresome.

According to the present invention the user is entirely relieved from the operation of the shear. There is provided a foot which is adapted to engage the ground, the foot being operatively connected to the shear blades. This foot is rockably mounted on the body of the shear and the entire shear mechanism is preferably carried on a relatively long handle. It is only necessary for the user to "step" the shear along the ground. The foot contacts with the earth and, rocking, operates the blades. The shear is then moved forward, during which time the foot is permitted to return to its general position and the operation is repeated indefinitely. Even an inexperienced person can cut the grass at astonishingly high speeds as compared with those obtainable in ordinary garden shears, and this with a minimum of effort. Furthermore, the foot predetermines the height to which the grass is cut.

In the accompanying drawings, illustrating the present preferred embodiment of the invention and one modification thereof, Figure 1 is a side elevation, partly broken away, showing my improved shear;

Figure 2 is a horizontal section taken on the line II—II of Figure 1;

Figure 3 is a rear elevation; and

Figure 4 is a side elevation, partly in section, of a modified form of foot.

The shear illustrated in Figures 1 to 3 inclusive, comprises a body 2 having a socket portion 3 adapted to receive a relatively long handle 4 and having downward extensions 5 which are flared outwardly to form feet 6. Shear blades 7 are pivotally connected to the feet 6 by rivets 8, and the blades are, in turn, pivotally connected together by a loose pin 9. The provision of a loose shoulder pin, such as shown in the drawings, is of value in that it biases the blades toward one another and insures a clean shearing cut at all times. This feature forms the subject matter of the pending application of Robert A. Purcell, Serial No. 210,494, filed Aug. 4, 1927.

The pivot pin 9 is spaced forwardly of the rivets 8, as best shown in Figure 2, and the natural spring of the extensions 5 tends to move the blades to the open position of Figure 2. Such blades are provided with inter-engaging shoulders 10 which limit the outward movement. A coil spring 11 aids in biasing the blades to open position.

The closing of the blades to effect shearing is accomplished by a link 12 connecting the top of the pin 9 to a cross pin 13 in a foot 14. The foot 14 is rockably mounted in the body 2 on a pin 15 and is provided with an enlarged lower end having teeth 16 formed therein to form an anti-skid face.

When the blades are in their open position, the foot lies in the solid line position of Figure 1, and when the handle 4 is urged forward by the user the shear proper moves forward with the handle rocking on the foot 14. When the foot reaches the dotted line position of Figure 1, the forward motion is checked by a stop 17 which engages the body 2. The operator then relieves slightly his downward pressure on the handle, permitting the blades to open and thus causing the foot to return to the solid line position of Figure 1. This operation can be carried out at high speed and is very effective for rapid shearing.

The foot 14 is extended below the shear blades and determines the height to which the grass is cut. The bottom of the foot, as best shown in Figure 3, is of large size so as to insure of non-slipping engagement with the earth.

Figure 4 illustrates a modified form of foot wherein a rubber tread 18 is substituted for the toothed face 16. This is of value along stone and cement walks and the like.

I have illustrated and described a present preferred embodiment of the invention. It will be understood, however, that it is not limited to the form shown but may be otherwise embodied within the scope of the following claims.

I claim:

1. A garden shear comprising a shear blade and a pivoted foot adapted to engage the ground, the foot being operatively connected to the shear blade so as to actuate the same on forward movement of the shear.

2. A garden shear comprising a body, a shear blade carried thereby, a foot pivoted on to the body, and a connection between the shear blade and the foot.

3. A garden shear comprising a body, a shear blade carried thereby, a reciprocable foot pivoted on to the body, and a connection between the shear blade and the foot.

4. A garden shear comprising a body, a shear blade carried thereby, a reciprocable foot pivotally mounted on the body and having an anti-skid face, and a connection between the shear blade and the foot.

5. A garden shear comprising an extended handle, shear blades near the bottom thereof, a pivoted foot near the bottom thereof, and an operating connection between a shear blade and the foot.

6. A garden shear comprising a body, a shear blade carried thereby, a foot pivoted on to the body, a connection between the shear blade and the foot, and stop means for limiting the movement of the shear blades on reciprocation of the foot.

7. A garden shear comprising a body having extensions, shear blades pivotally mounted on the extensions, a foot pivoted on the body projecting downwardly between the extensions, and an operating connection between a shear blade and the foot.

8. A garden shear comprising a body, shear blades carried thereby, a foot pivoted on to the body and extending below the shear blades a distance corresponding to the desired cutting height of the shear, and a connection between a shear blade and the foot.

9. In a shear, a handled frame, blades pivoted thereto in a horizontal plane, and a pivoted ground-engaging foot on the frame rockable in a vertical plane and connected to said blades, whereby when the shear moves forward the foot actuates the blades.

In testimony whereof I have hereunto set my hand.

HAROLD W. CLARK.